United States Patent [19]

Stafford et al.

[11] Patent Number: 4,470,212

[45] Date of Patent: Sep. 11, 1984

[54] TAGS, PARTICULARLY EAR TAGS

[76] Inventors: Rodney A. Stafford, 57 Bushy Park Rd., Dublin 6; Michael M. Kilroy, Castlecor, Oldcastle, County Meath, both of Ireland

[21] Appl. No.: 357,747

[22] Filed: Mar. 12, 1982

Related U.S. Application Data

[63] Continuation-in-part of Ser. No. 167,721, Jul. 11, 1980, abandoned.

[30] Foreign Application Priority Data

| Jul. 13, 1979 | [IE] | Ireland | 491/79 |
| Sep. 12, 1979 | [IE] | Ireland | 1738/79 |
| Dec. 4, 1979 | [IE] | Ireland | 2336/79 |
| Mar. 16, 1981 | [IE] | Ireland | 576/81 |
| Apr. 16, 1981 | [IE] | Ireland | 889/81 |

[51] Int. Cl.³ ............................................ G09F 3/00
[52] U.S. Cl. .................................. 40/301; 40/300; 40/302
[58] Field of Search ................ 40/300, 301, 302; 119/156; 292/318, 319, 321

[56] References Cited

U.S. PATENT DOCUMENTS

| 1,347,868 | 7/1920 | Nichols | 40/302 |
| 1,385,530 | 7/1921 | Elzi | 40/302 |
| 1,493,076 | 5/1924 | Hughes | 292/318 |
| 1,831,569 | 11/1931 | Ker | 40/302 |
| 2,230,585 | 2/1941 | Canter | 40/302 |
| 2,940,199 | 6/1960 | Goldberg | 40/301 |

FOREIGN PATENT DOCUMENTS

| 651516 | 12/1964 | Belgium . |
| 142437 | 6/1903 | Fed. Rep. of Germany . |
| 373805 | 4/1923 | Fed. Rep. of Germany . |
| 589107 | 12/1933 | Fed. Rep. of Germany . |
| 676066 | 5/1939 | Fed. Rep. of Germany . |
| 846332 | 6/1952 | Fed. Rep. of Germany . |
| 858267 | 11/1940 | France . |
| 902176 | 8/1945 | France . |
| 1069824 | 7/1954 | France . |
| 1569849 | 6/1969 | France | 40/301 |
| 7322752 | 1/1974 | France . |
| 7245376 | 8/1974 | France . |
| 2435197 | 4/1980 | France . |
| 2497631 | 7/1982 | France | 40/301 |
| 241775 | 5/1976 | Ireland . |
| 182876 | 2/1977 | Ireland . |
| 271676 | 6/1978 | Ireland . |
| 237877 | 5/1979 | Ireland . |
| 247378 | 6/1979 | Ireland . |
| 90047 | 8/1921 | Switzerland . |

(List continued on next page.)

*Primary Examiner*—Gene Mancene
*Assistant Examiner*—Cary E. Stone
*Attorney, Agent, or Firm*—Stevens, Davis, Miller & Mosher

[57] ABSTRACT

A tag, particularly an ear tag for marking animals such as cattle which have passed an official test, comprises a strip formed into two limbs and a hollow rivet, preferably of brass, perpendicular to one of the limbs, the rivet comprising a stock portion which may be frusto-conical or cylindrical surmounted by a narrower neck portion of reduced wall thickness surmounted by an enlarged head portion preferably in the form of a cylindrical punch having a sharp cutting edge. The wall thickness is at a minimum adjacent a shoulder which forms the transition from the stock portion to the neck portion. There is a receiver hole in the other limb of the strip to receive the rivet head. As the tag is being closed, the head punches a hole in the animal's flesh, and passes through the receiver hole after which the head is splayed outwardly. A spring clip may be secured over the receiver hole or the metal of the strip around the receiver hole may be hardened e.g. by stamping. If an attempt is made to force the limbs apart, the rivet tends to break at the point of minimum wall thickness in the neck portion. The rivet may be formed from the material of the strip. A special insert for a tagging tool is also described, this insert having a conical boss set in the center of a recess into which the head of the rivet is forced. The tag is easy to apply by manual pressure, liable to break if an attempt is made to force it open and easy to check visually for evidence of tampering.

10 Claims, 23 Drawing Figures

FOREIGN PATENT DOCUMENTS

| | | |
|---|---|---|
| 25481 | of 1911 | United Kingdom . |
| 161270 | 4/1921 | United Kingdom . |
| 330705 | 6/1930 | United Kingdom . |
| 468591 | 7/1937 | United Kingdom . |
| 473738 | 10/1937 | United Kingdom . |
| 532056 | 1/1941 | United Kingdom . |
| 624860 | 6/1949 | United Kingdom . |
| 745140 | 2/1956 | United Kingdom . |
| 894143 | 4/1962 | United Kingdom . |
| 983219 | 2/1965 | United Kingdom . |
| 1053454 | 1/1967 | United Kingdom . |
| 1158869 | 7/1969 | United Kingdom . |
| 1352874 | 5/1974 | United Kingdom . |
| 1509565 | 5/1978 | United Kingdom . |

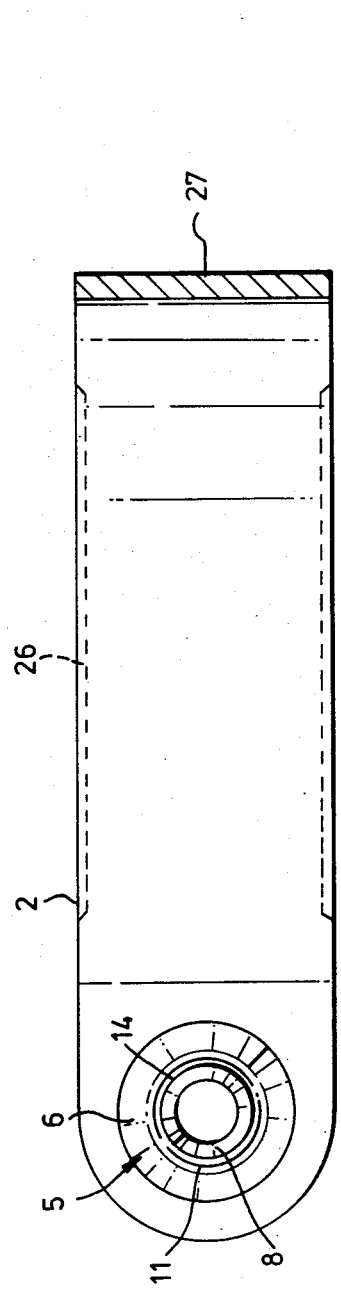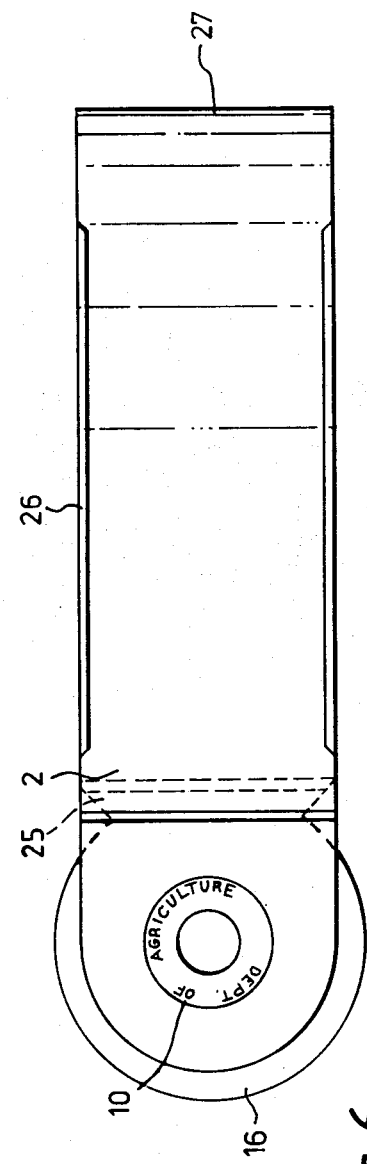
Fig.5.
Fig.6.

Fig.11.
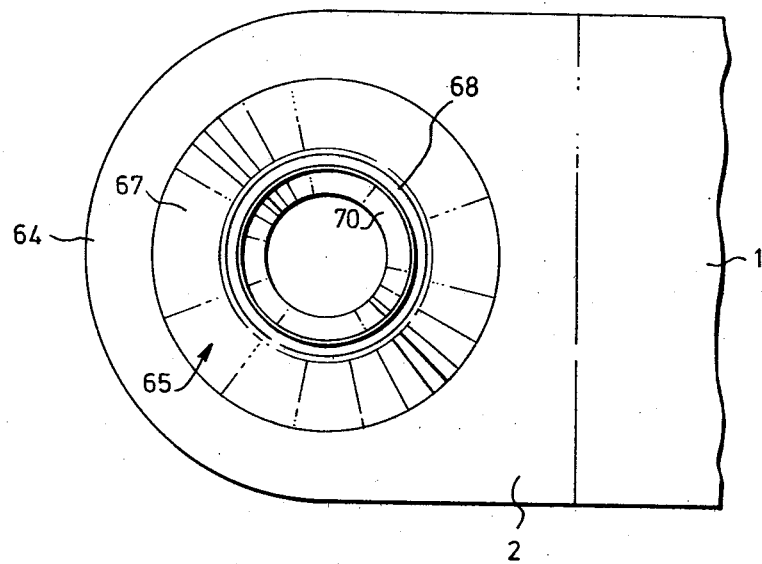
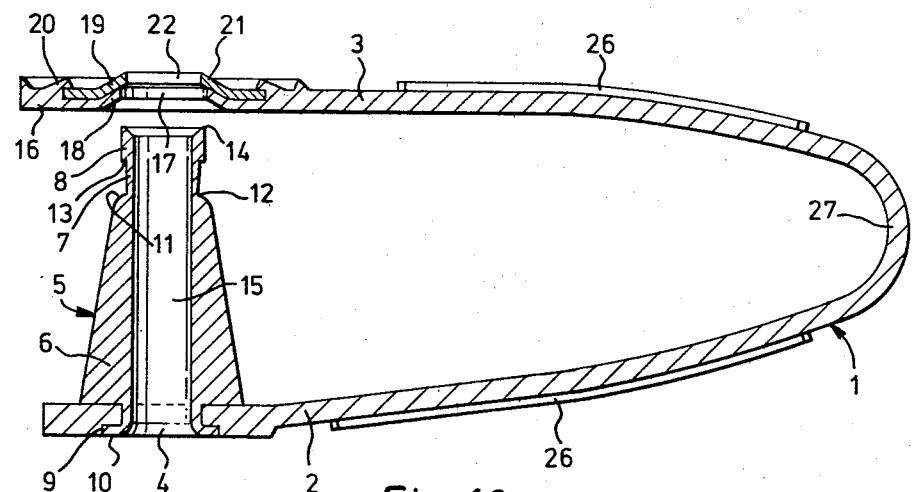
Fig.12.

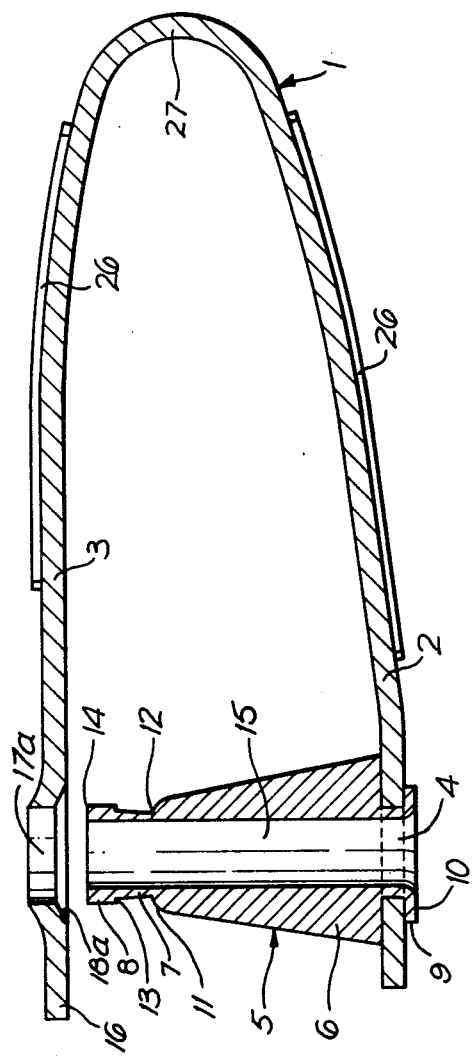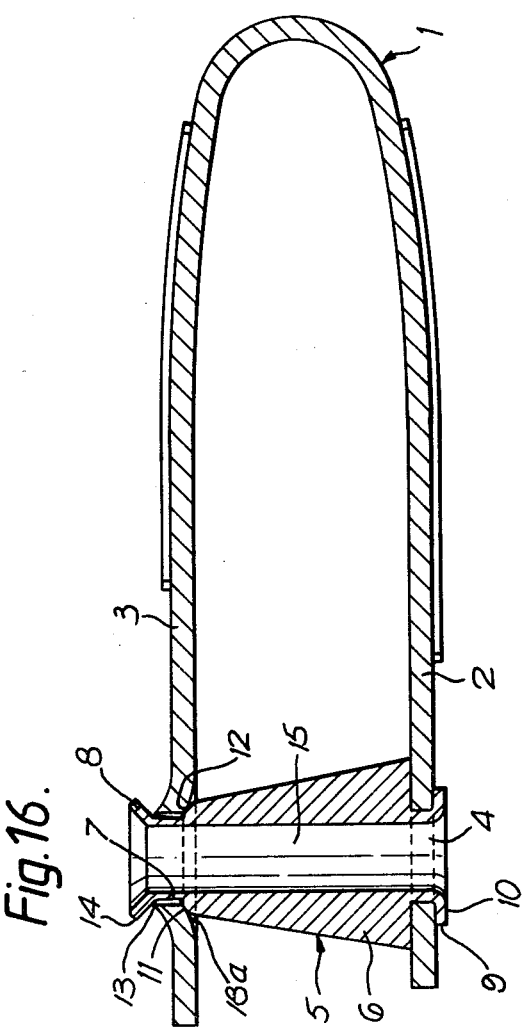

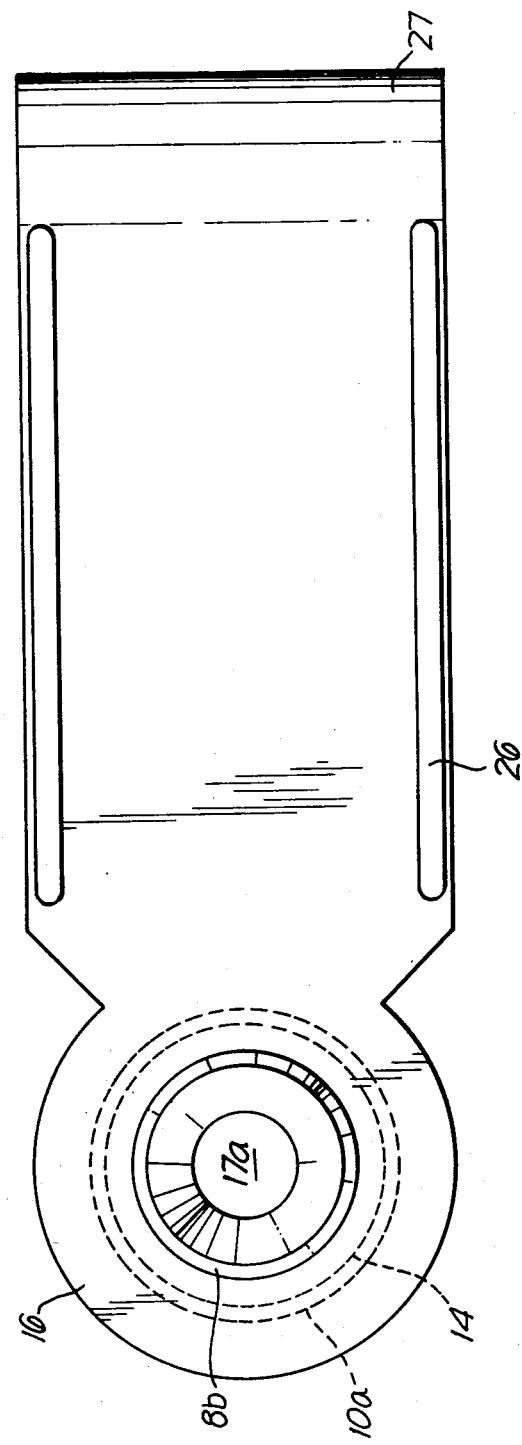

TAGS, PARTICULARLY EAR TAGS

CROSS REFERENCE TO RELATED APPLICATION

This is a continuation-in-part of application Ser. No. 167721 filed 11th July 1980, abandoned.

BACKGROUND OF THE INVENTION

1. Field of the Invention

This invention relates to tags, especially marker tags for livestock, and has particular relevance to ear tags intended to be applied to cattle to indicate that an animal has passed a particular health inspection or test. It is an object of the invention to improve the "tamper-proof" qualities of the identification tags known hitherto.

An animal marked with an official identification tag may be considerably more valuable in the market place than one which is not so marked. It is therefore tempting for unscrupulous persons to obtain used ear tags, usually from slaughtered animals, to open the ear tags and then re-apply them to animals which have not passed the official inspection or test.

2. Description of the Prior Art

There have been previous attempts to devise a satisfactory form of tamper-proof ear tag. In our British patent specification No. 1 509 565 we described an ear tag for livestock comprising a strip doubled over into two limbs and having a hollow rivet blank standing up at the free end of one of the limbs, the rivet blank comprising a stock portion surmounted by a narrower neck portion, a receiver hole through the strip near to the free end of the other of the limbs, the receiver hole being large enough to accommodate the neck portion but not the stock portion, and the neck portion having a depth such that when it has passed through the receiver hole it can be curled out and back under itself to form a rolled bead. However, this earlier invention of ours has not proved entirely successful because it was difficult in practice to form a rolled bead on every tag and if the rolled bead was only partially formed there was a risk that the tag could be opened and re-used.

French patent specification No. 73.22752 describes various forms of ear tag of the "button" type consisting of a plastics plate bearing identification markings, a rivet and a plastics locking button to receive the rivet head. In the embodiment of FIG. 6 the rivet head is locked in position in the button by a spring steel washer. However, the rivet has a solid body and neck which could be cut across and subsequently rejoined by bonding, or fitting a dowel, the head of the rivet being retained in the enclosed button cavity. The rivet pierces the ear tissue but does not cut away any of the tissue and clogging of the locking mechanism with tissue or hair can result. A tag having a plate and button joined only by a cylindrical rivet can rotate in the hole in the ear, thus causing the hole to enlarge after a period of time, leading to a risk of the tag falling out.

British patent specification No. 1 053 454 describes a tag formed by two tabs joined by a solid probe. The probe may have a conical shank. In the embodiment of FIGS. 17 and 18, an aperture intended to receive the head of the probe has cuts around it to form resilient tongues. However, there is nothing to prevent the tabs being pushed towards one another and thus enable the resilient tongues to be loosened. There is no discussion of the problems involved in making a tag tamper-proof.

U.S. Pat. No. 2,940,199 describes various forms of ear tag which can be secured in position by hand. In the embodiment of FIGS. 5, 6 and 7 the female part of the tag has tongues which engage in a groove below the head of the hollow male part. However, this is not a tamper-proof tag and indeed reference is made to the possibility of separating the tags when required by the use of a pair of pliers.

SUMMARY OF THE INVENTION

It is an object of the present invention to provide a tag which is easy to apply, reliable in use over a period of years, liable to break if an attempt is made to force it open and easy to check visually for evidence of tampering.

The present invention provides a tag comprising a strip formed into two limbs and a hollow rivet standing up at the free end of one of the limbs, said rivet comprising a stock portion surmounted by a narrower neck portion surmounted by a head portion which is externally cylindrical, said rivet having a shoulder between the stock portion and the neck portion, a receiver hole through the strip near to the free end of the second of said limbs, the receiver hole being of marginally greater diameter than the external diameter of the head portion of the rivet but of smaller diameter than the shoulder so that the receiver hole receives the head portion of the rivet when the tag is being closed, and the head portion being deformable radially outwardly to a splayed configuration, wherein the wall thickness of the rivet in the neck portion is less than that in the stock portion or head portion and is at a minimum adjacent the shoulder so that if an attempt is made to force the limbs of the tag apart after it has been closed, fracture of the rivet will tend to occur adjacent the shoulder.

Preferably the rivet and the strip are made of metal, preferably a cold-workable metal alloy, particularly a relatively soft metal, such as brass. The strip preferably has a hardness in the range 100–120 Brinell (or ½–¾ hard). However, a plastics material having the relevant properties similar to those of brass would also be usable for the strip, in the embodiment incorporating a spring clip as described below. The rivet is preferably leaded brass.

According to one aspect of the invention, a spring clip is secured over the receiver hole and coaxial therewith, the clip being adapted to allow the head portion of the rivet to be forcibly passed through it and being then adapted to interact with the rivet to cause it to break at the neck portion if an attempt is made to force the limbs apart.

Preferably the spring clip is made of stainless steel which is corrosion proof and non-allergic (i.e. does not cause a reaction in the flesh of the animal's ear). The clip is normally a thin domed washer of resilient metal having a central aperture at the apex of the dome through which a cylindrical body can be pushed in one direction (i.e. from below the dome) but which resists movement of the body in the reverse direction. The washer may have at least part of the metal surrounding the aperature split to form ears whose inner edges form part of the perimeter of the hole. The aperture should be at least a tight fit on the head portion of the rivet so that some force is required to push the head portion through the aperture, although the amount of force may not be very great. In practice, the action of closing the tag will be carried out with the force required to cut through the flesh of an animal's ear or other part which is being tagged. Preferably, when the tag is closed, the portion of the second limb defining the receiver hole mates against the shoulder, so that the limb cannot be pushed along the stock portion towards the first limb.

According to another aspect of the invention, in a metal tag without a spring clip or having a spring clip as an integral part of the strip, the metal of the strip which defines the receiver hole is hardened so that it is adapted to interact with the splayed rivet to cause it to break at the neck portion if an attempt is made to force the limbs of the tag apart after it has been closed. In a preferred feature of this aspect of the invention, the hardening of the metal around the receiver hole has been effected by working the metal, particularly by cold working such as by stamping, preferably during formation of the receiver hole and/or shaping of an annulus around the receiver hole.

The hard annulus around the receiver hole has a similar effect to a steel spring clip i.e. it is harder than the neck portion of the rivet which is soft relative thereto. Due to the relative weakness of the neck and the interaction of the spring clip or hardened annulus against the soft neck portion, the head portion tends to break off from the stock portion if an attempt is made to tamper with the tag by forcing the limbs apart. As the wall thickness of the neck portion is at a minimum adjacent to the shoulder, fracture will usually occur at this point, leaving no appreciable fragment of the neck which could be used in an attempt to re-use the tag.

A further preferred feature of the invention is that the shank of the stock portion has a frusto-conical external surface. In one form of the preferred embodiment, the rivet is integral with, and formed from, the material of the strip.

According to a further aspect of the invention, the rivet is formed as a separate component from the strip but has a stock portion of frusto-conical exterior and substantially constant wall thickness, the rivet being secured in a mounting hole in the strip which is of substantially the same diameter as the external surface of the base of the stock portion of the rivet. Preferably the mounting hole is defined by a conical wall surface. Preferably also, the rivet is secured by deforming the external surface of the rivet to form a retaining clip which engages the upper surface of the strip around the mounting hole.

In an additional aspect, the invention provides a method of tagging an animal which comprises inserting a part of the animal's flesh between the head portion of the rivet and the second limb of the tag of the preferred embodiment, closing the tag by manual pressure upon a tagging tool so that the head portion cuts through the flesh and is pushed through the spring clip and deforming the head portion radially outwardly to form a splayed flange.

The present invention also provides a deforming insert for a tool for applying tags of the preferred embodiment, the insert having a cylindrical recess to receive the head portion of the rivet, a wall surrounding the recess being adapted to engage an annular outer portion of the clip, and a conical boss located coaxially in said recess to deform the head of the rivet radially outwardly. Preferably the deforming insert is pivotally mountable on the tool so as to permit a small arc of swivelling.

BRIEF DESCRIPTION OF THE DRAWINGS

The invention is illustrated in the accompanying drawings, in which:

FIG. 5 is a plan view of the rivet and lower limb of the tag of FIG. 1.

FIG. 6 is an underneath view of the tag of FIG. 1.

FIG. 11 is a plan view of the rivet and lower limb of the tag of FIG. 10.

FIG. 12 is a vertical sectional view of a fourth embodiment of the invention, showing the tag in the open position.

FIG. 15 is a vertical sectional view of a fifth embodiment of the invention, showing the tag in the open position;

FIG. 16 is similar to FIG. 15, but showing the fifth embodiment in the closed position;

FIG. 23 is a plan view of the seventh embodiment in the closed position.

Figure 1:
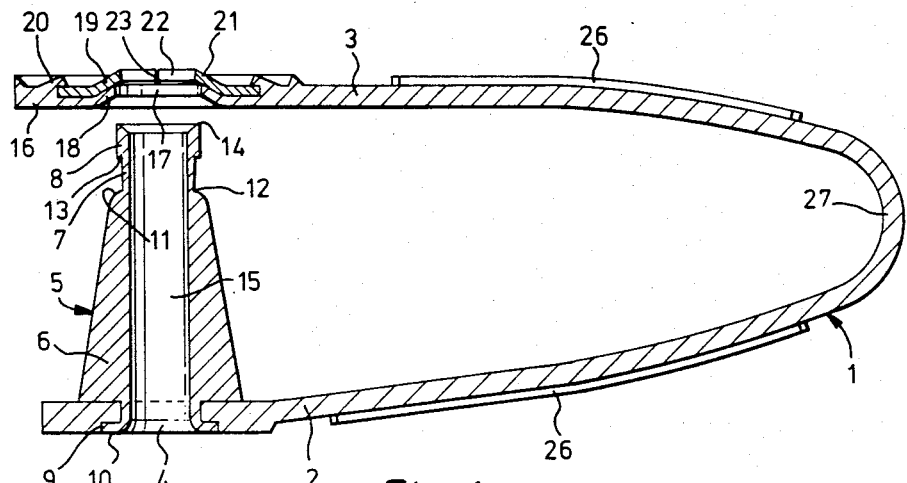
FIG. 1 is a vertical sectional view of preferred embodiment of the invention, showing the tag in the open position.

The animal's ear is omitted from the drawings for the sake of clarity. The terms "top", "bottom", "upper", "lower" etc. are used herein for descriptive purposes and do not necessarily relate to the positions of the parts of the tag or tool in use.

DESCRIPTION OF THE PREFERRED EMBODIMENTS

As shown in FIGS. 1–7, an ear tag in accordance with the first embodiment comprises a strip 1 doubled over to form a lower limb 2 and an upper limb 3. Near to the free end of lower limb 2 there is a mounting hole 4 in which is secured a hollow rivet or piercing member 5 comprising a stock 6 and a narrower neck 7 and an enlarged head 8. The rivet 5 stands up from the lower limb 2 at right angles thereto. The free end portion of the lower limb has a greater thickness than the remainder of the limb.

The main part of the stock 6 has a frusto conical external surface which tapers upwardly. The bottom end of the stock is of reduced external diameter where it enters the mounting hole, the periphery of said mounting hole being rabbeted to receive the outwardly swaged lower extremity 9 of the stock, which forms an annular flange 10 onto which an official marking is impressed. As shown in FIG. 6, the marking takes the form of the words "Dept. of Agriculture."

At the top of the stock the external surface curves radially inwardly to form a rounded shoulder 11 in the transition to the neck 7 which is of substantially less external diameter than the stock 6. The wall thickness of the neck 7 is at a minimum at point 12 adjacent to the rounded shoulder 11 and increases slightly towards the head 8. The head is externally cylindrical with a ledge 13 at its lower edge forming the transition from the neck 7 to the head 8. The external diameter of the head is greater than that of the neck 7 but smaller than that of the stock 6 below the shoulder 11. The free end of the head is chamfered internally to make a sharp annular punch having a cutting edge 14. The internal diameter of the rivet is constant so that there is a cylindrical passage 15 through the rivet.

Figure 3:
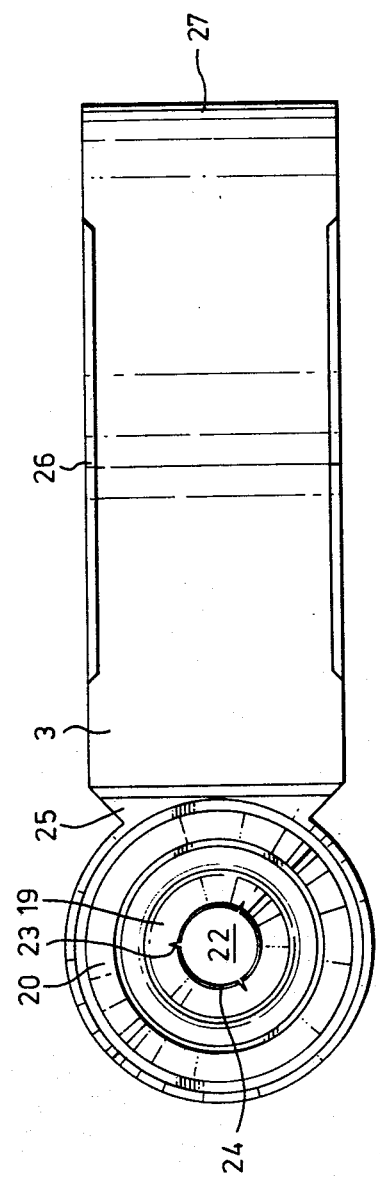
FIG. 3 is a top view of the tag of FIG. 1 in the open position.
Figure 4:
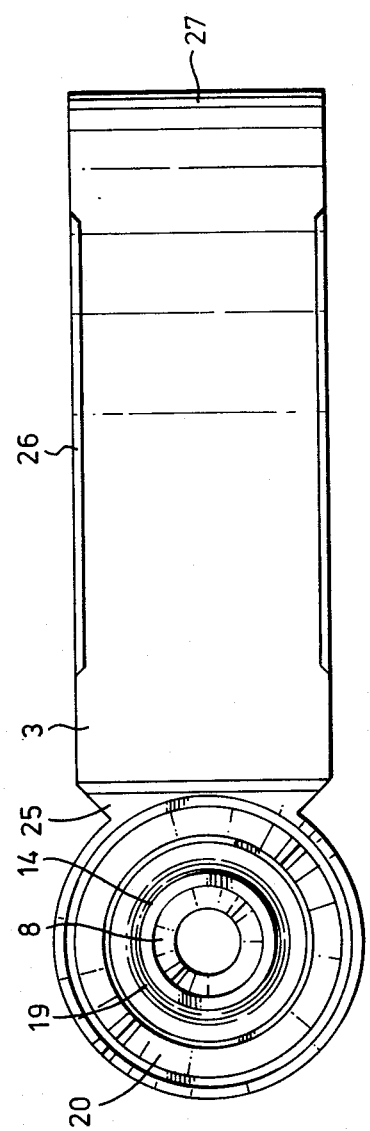
FIG. 4 is a top view of the tag of FIG. 1 in the closed position.

At the free end of the upper limb there is a ring-shaped portion 16 defining a receiver hole 17 which comes into alignment with the rivet 5 when the tag is being closed and which is of marginally greater diameter than the external diameter of the head 8 but which is of smaller diameter than the external diameter of the shank 6 below the shoulder 11. The ring-shaped portion 16 includes a central annulus 18 which slopes upwardly towards the receiver hole 17. On its upper surface the ring-shaped portion 16 has a recess to receive an annular spring steel clip 19 (known as a "speed clip") which is retained by a rib 20 overlapping the periphery of the steel clip. The steel clip is above the receiver hole and coaxial therewith. The steel clip 19 has the form of a circular disc or washer of stainless steel with a flat outer annular portion and a central upwardly domed portion 21 at the centre of which there is a gripping aperture 22. The domed portion is split by several radial cuts 23 extending outwardly from the gripping aperture. As shown in FIG. 3, there are three radial cuts. Between the radial cuts 23, the domed portion forms resilient ears 24. Both the gripping aperture 22 and the radial cuts have been stamped into the disc, but the radial cuts have been formed without any substantial removal of metal from between the ears 24. The gripping aperture 22 is precisely dimensioned in relation to the head 8 of the rivet so that the head can be forced through the gripping aperture with the aid of a manually operated tagging tool. The diameter of the gripping aperture 22 when undistorted is marginally less than that of the head 8 and approximately equal to that of the neck 7.

The steel clip 19 lies on top of and is supported by the central annulus 18 of the ring-shaped portion 16 of the upper limb. The domed portion 21 slopes upwardly at the same angle as the annulus 18. The gripping aperture 22 has a smaller diameter than the receiver hole 17 and the resilient ears 24 project radially inwardly beyond the edge of the receiver hole 17.

The ring-shaped portion 16 is integral with limb 3 but is joined to the remainder of the limb only by a bridge 25 which is of reduced width as compared to the remainder of the limb and which may optionally have grooves on both top and bottom surfaces to form a zone of weakness across the limb.

Both the bottom limb 2 and the top limb 3 have raised longitudinal edges 26 which stand proud of the outer surface of the limb. These raised edges run along both limbs but not around the curved part 27 of the strip. Official markings are impressed into the outer surface of one or both of the limbs and the raised edges serve to protect the markings from abrasion. If an official marking is to be impressed into the surface of one limb only, the raised edges 26 may of course be omitted on the other limb.

Figure 2:
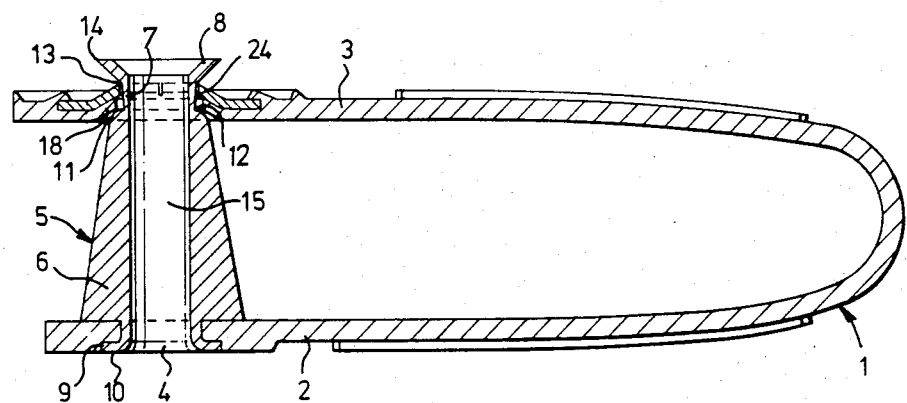
FIG. 2 is similar to FIG. 1, but showing the tag in the closed position.

FIG. 2 shows the tag in the closed position. The head 8 of the rivet has been forced through the gripping aperture 22 and has subsequently been deformed outwardly to a splayed configuration. The ears 24 of the steel clip have snapped in around the neck 7 and lodged under the ledge 13. The central annulus 18 on the ring shaped portion 16 of the upper limb 3 is seated on the shoulder 11.

Figure 7:
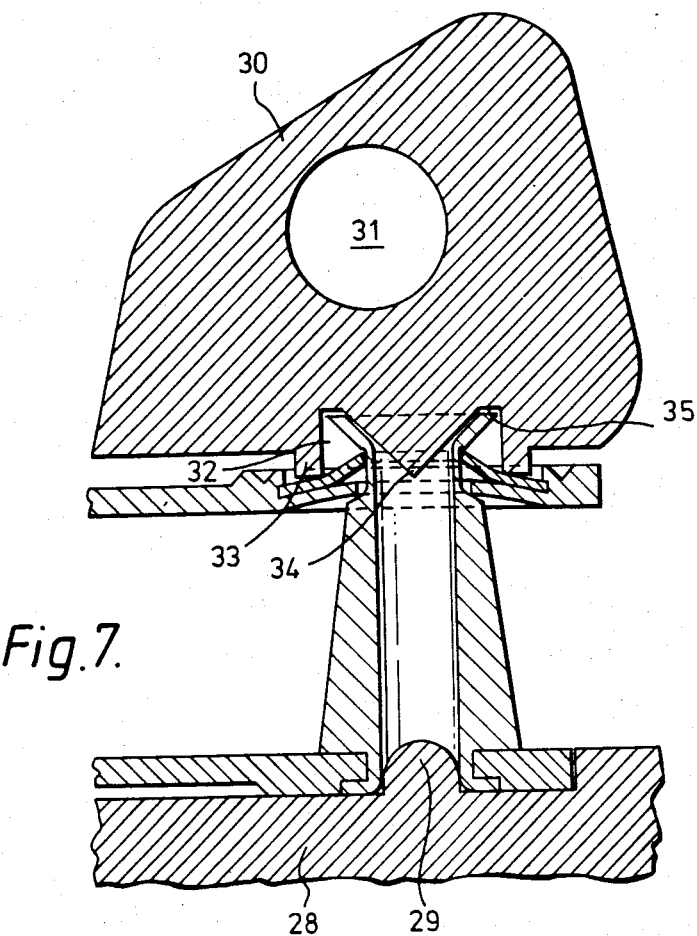
FIG. 7 is a vertical sectional view of an embodiment similar to that of FIG. 1 in the closed position in a tagging tool (shown in part).

The tag is applied by a tagging tool such as a quick release pliers of the type available from Richard Herberholz KG, Wuppertal, Federal Republic of Germany. As shown in FIG. 7, one arm 28 of the pliers is provided with a stud 29 which engages in the mounting hole 4 in the lower limb 2 of the tag. Pivotally mounted in the other (fixed) arm of the pliers is an insert 30 which can pivot through a small arc on a screw passing through a pivot hole 31. The insert 30 has a cylindrical recess 32 surrounded by a wall 33.

Figure 8:
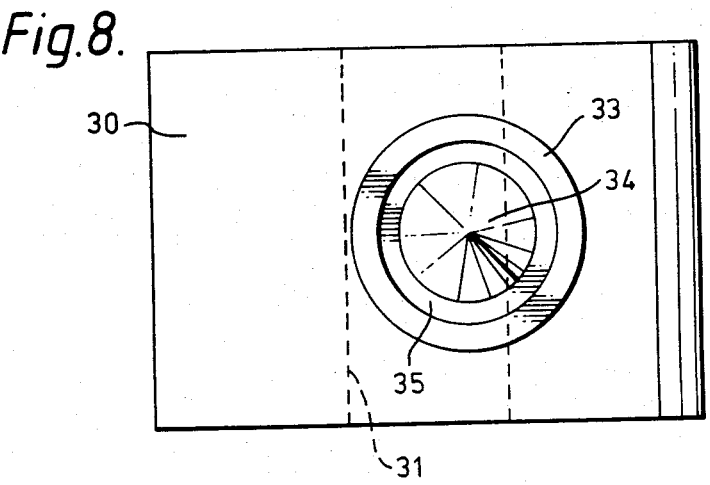
FIG. 8 is a plan view of a deforming insert for a tagging tool as shown in FIG. 7.

Axially disposed in the recess is a conical boss 34 whose apex lies substantially in the same plane as the leading edge of wall 33. The conical boss 34 has a base diameter less than the diameter of the recess so that a trough 35 is formed around the boss (see FIG. 8).

When the tag is being applied, an animal's ear is inserted between the top of head 8 and the underside of the top limb 3. As the tagging tool is closed the cutting edge 14 on top of the head 8, interacting with the receiver hole 17 on the upper limb 3, cuts through the ear and cuts out a circle of flesh which is usually discharged through passage 15 along the axis of the rivet. If the fragment of flesh is not discharged, it may be dislodged from the passage by a match-stick or narrow rod or the like at any time when the tag is being inspected. Because the head 8 has an external diameter which is only marginally smaller than the diameter of the receiver hole 17, the head acts like a paper punch, and tissue and hair are removed, thus avoiding clogging of the steel clip or the groove around the neck 7.

The head 8 passes through receiver hole 17 and, as continued pressure is applied on the tool, the head is forced through the gripping aperture in the steel clip 19, which flexes upwardly. The wall 33 on the tool insert 30 presses down on the outer annual portion of the steel clip during the closing procedure. As the tool continues to close, head 8 encounters conical boss 34 and the head is splayed outwardly without splitting. The steel clip springs into position around the neck 7 and behind the splayed out head. FIG. 7 shows the situation when the tool has reached its fully-closed position, just before the quick release mechanism operates to open the tool. It will be seen that the head has been splayed out to an external diameter which is slightly less than the diameter of the recess 32 so that the head can leave the recess when the tool is opened.

If an attempt is made to tamper with the tag by forcing limbs 2 and 3 apart the steel clip resists any movement which would cause it to deform downwardly and the ears 24 grip tightly around neck 7 and may even cut into it. Due to the relative weakness of neck 7, and the interaction of hard steel against soft brass, the most likely result is that the head will break off from the stock. As the wall thickness of the neck is smallest at point 12 adjacent to shoulder 11, the fracture will usually occur at this point, leaving no appreciable fragment of the neck which could be used in an attempt to re-use the tag.

The conical shape of the stock 6 defeats any attempt to tamper with the tag by sawing through the stock and then fitting a cylindrical sleeve around the stock to conceal the saw cut.

As the steel clip 19 and the splayed out head are exposed on top of the tag, any attempt to tamper with them can be seen on visual inspection. Similarly an attempt to tamper with the bottom of the rivet will deform the official marking on flange 10 and can be seen by visual inspection. Such inspection will also show if the rivet has been replaced by another one which does not have the official marking on flange 10.

A mandrel or match stick can be inserted through the axial passage 15 to check that there has been no reduction in the internal diameter of the rivet or blockage of the axial passage as part of an attempt to rejoin a tag which has been cut open, for example rejoining by use of a dowel in the passage.

The engagement of upper limb 3 against shoulder 11 prevents the upper limb being pushed down towards the lower limb to make access to the ears of the speed clip easier or to force them apart by pushing them onto the stock portion.

The steel clip is inaccessible from above because it is held in a recess in the upper limb, and the metal of the upper limb has been deformed over its periphery. If desired, the rib 20 can be marked by a deforming tool with a milled surface, so that any attempt to tamper with the rib will be easier to see.

A suitable tag has a strip 1 made from brass with a hardness of 115 Brinell ("¾ hard"). Brass, being relatively soft, allows deep embossing of code letters and numbers, which are easy to read, without causing undue wear to the embossing tool and shortening its useful life.

Alternatively the whole of the strip, incorporating the "speed clip" as an integral part thereof, may be made of stainless steel, the "speed clip" area being hardened while the main part of the strip remains relatively soft.

The rivet is suitably turned brass having a hardness such that it cuts the ear of an animal, that it deforms on meeting the conical boss 34 to form a splayed head without splitting and that it breaks at the neck when an attempt is made to force the tag open.

In manufacturing the tag of the first embodiment described above, the strip 1 is stamped out as a flat strip with the mounting hole 4 and the receiver hole 17 cut therein, with the sloped annular portion 18 around the receiver hole and the recess to receive the spring clip. Material to form the rib 20 is also provided around the recess, and the raised edges 26 are formed.

The steel clip is then inserted into the recess and the material of the rib 20 is deformed over the periphery of the clip. The bottom of the rivet is inserted through the mounting hole 4 and its lower extremity is outwardly swaged into position. The official marking is then impressed onto flange 10. Finally the strip 1 is bent to form the two limbs 2 and 3 joined by the curved portion 27.

In one sample of the first embodiment, the strip 1 is 1 mm thick except at the free end of the lower limb where it is 1.5 mm thick. The steel clip is about 0.5 mm thick and 10 mm in diameter. The gripping aperture 22 is 3.7 mm in diameter while the receiver hole 17 is 4.2 mm in diameter. The head 8 is 4 mm in external diameter and 2.0 mm high. The neck, which is 1.8 mm high, varies in external diameter from 3.6 mm at point 12 to 3.7 mm adjacent to ledge 13. The internal diameter of the rivet is 3 mm. The external diameter of the stock increases from 5 mm at shoulder 11 to 8 mm at the lower limb 2. The height of the rivet from lower limb 2 to the top of the head is 13.5 mm. The height of the rivet may be varied to suit the average thickness of the ears or other parts of the animals to be tagged.

Figure 9:
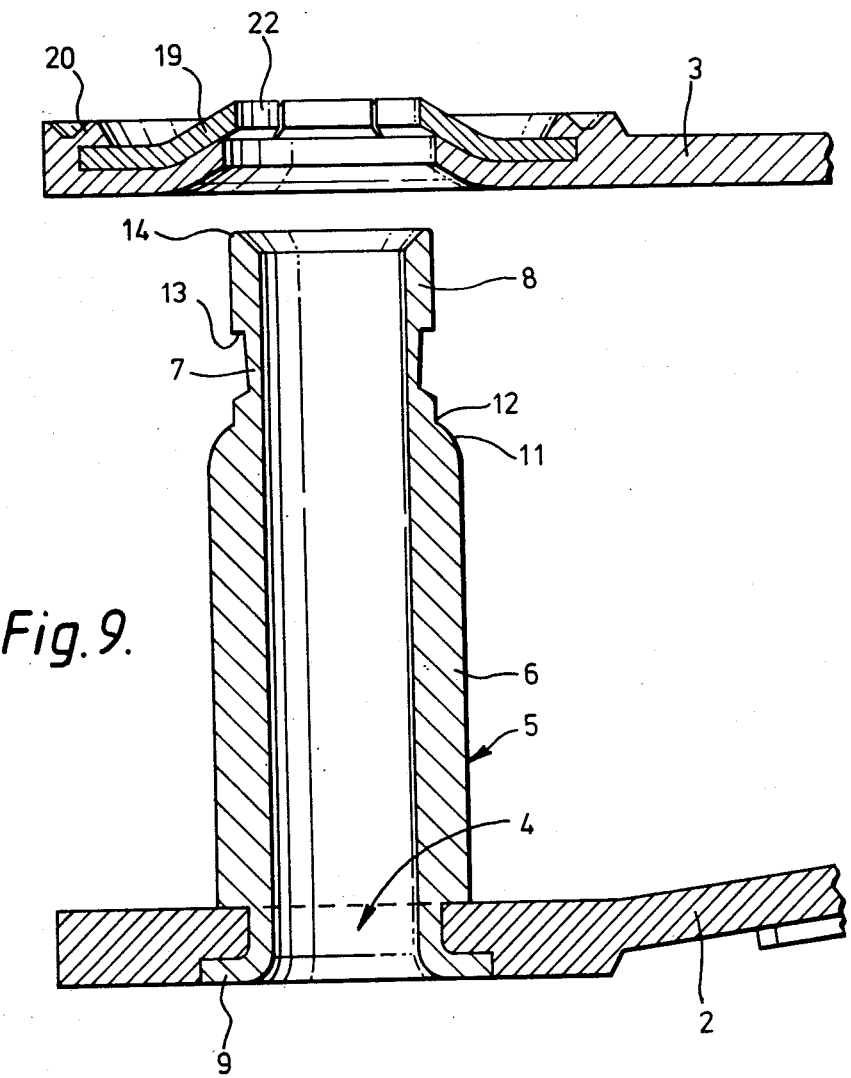
FIG. 9 is a vertical sectional view of part of a second embodiment of the invention, showing a portion of the tag in the open position.

FIG. 9 shows a second embodiment of the invention which is similar to the first embodiment except that the stock 6 of the rivet 5 has a cylindrical external surface instead of a frusto-conical one. The second embodiment has all the advantages of the first embodiment except that it would be possible for an unscrupulous person to cut across the shank and rejoin the tag by slipping a sleeve around the shank. Nevertheless such tampering can be detected visually from both the exterior and the interior of the rivet.

Figure 10:
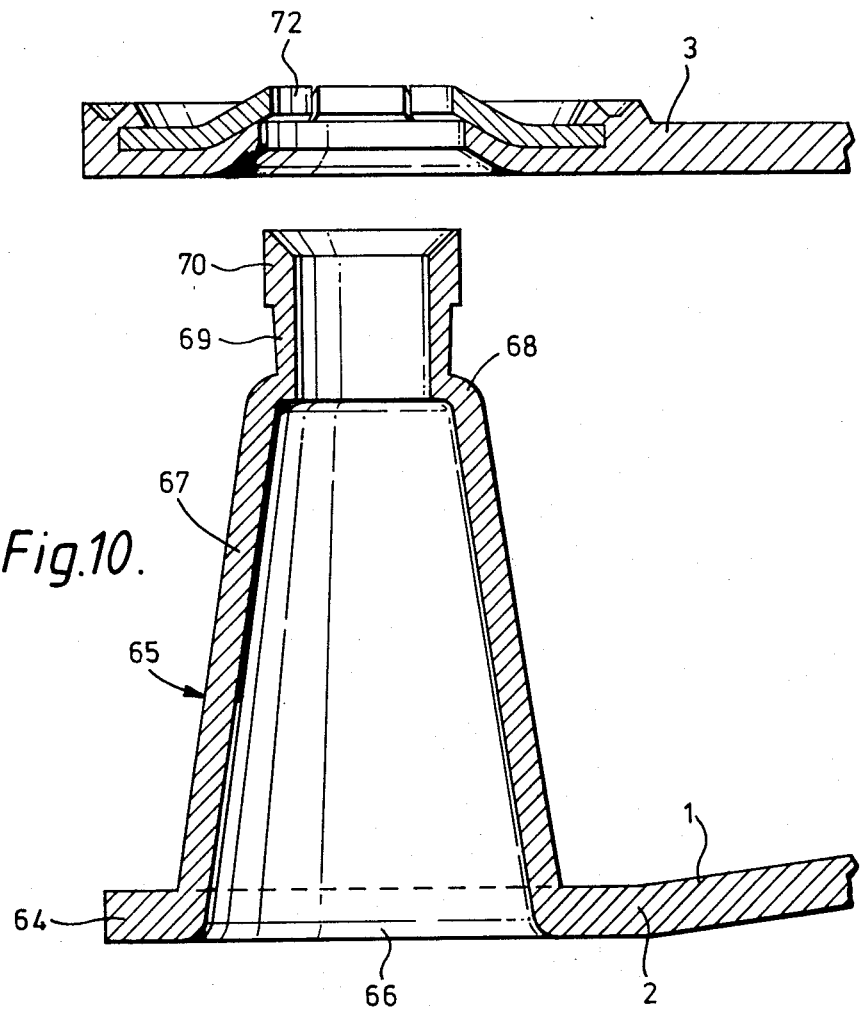
FIG. 10 is a vertical sectional view of part of a third embodiment of the invention, showing a portion of the tag in the open position.

FIGS. 10 and 11 show a third embodiment of the invention in which the rivet is integral with, and formed from the material of, the strip. The rivet 65 has been formed from the brass of the free end portion 64 of the lower limb 2 by stamping and deforming the brass, starting initially with a flat strip and finishing with the hollow rivet as shown in FIG. 10. The area of the lower limb from which the rivet 65 has been formed is left as a hole 66.

The rivet 65 has a stock portion 67 of frusto-conical exterior and a substantially constant wall thickness. The neck and head are substantially as described above.

The free end portion 64 of the lower limb 2 may initially have any shape suitable to form a blank from which the rivet can be stamped or otherwise obtained.

The provision of a rivet by deformation of the material of the strip avoids an assembly step as compared to the previous embodiments. The integral rivet is even less likely to be tampered with than the separate rivets of the previous embodiments.

Figure 13:
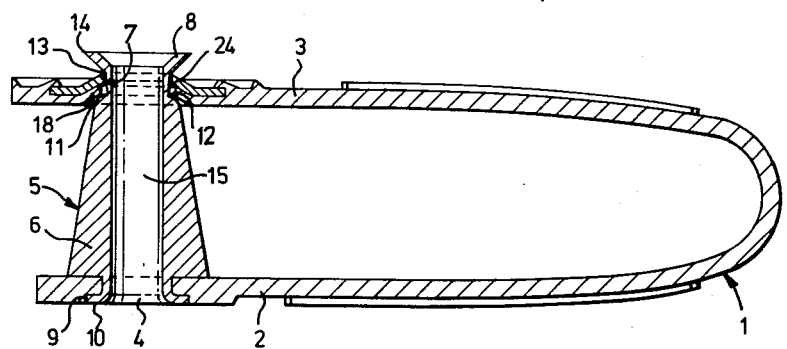
FIG. 13 is a similar view of the fourth embodiment of the invention, showing the tag in the closed position.
Figure 14:
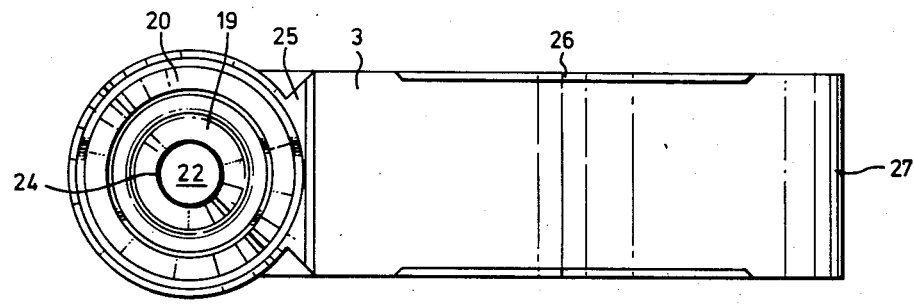
FIG. 14 is a top view of the tag in FIG. 12.

FIGS. 12-14 show a tag similar to that of FIG. 1 except that the "speed clip" 19 has no radial cuts so that domed portion 21 is a continuous annulus and is not divided into ears. The diameter of the gripping aperture 22 is slightly greater than that of the embodiment of FIG. 1, but it is nevertheless marginally less than that of the head 8.

When this tag is being closed, the head 8 is pushed through the gripping aperture 22, causing the domed portion of the speed clip to flex upwardly. The tight fit of the aperture around the head 8 cuts off residual hairs which may be left after the flesh of the ear has been punched out. Oils from the flesh lubricate the relative movement of the head and "speed clip".

The tags may be applied to an animal's ear in either direction i.e. the head of the rivet may be directed towards either surface of the ear, but it is preferred to have the head of the rivet at the back of the ear.

As shown in FIGS. 15–18, an ear tag in accordance with the fifth embodiment comprises a strip 1 doubled over to form a lower limb 2 and an upper limb 3. Near to the free end of lower limb 2 there is a mounting hole 4 in which is secured a hollow rivet or piercing member 5 comprising a stock 6 and a neck or weak portion 7 and a head 8. The rivet 5 stands up from the lower limb 2 at right angles thereto.

The main part of the stock 6 has a frusto-conical external surface which tapers upwardly. The bottom end of the stock is of reduced external diameter where it enters the mounting hole, and the lower extremity 9 of the stock is outwardly swaged to form an annular flange 10 onto which an official marking is impressed. For example, the marking may take the form of the words "Dept. of Agriculture."

At the top of the stock the external surface curves radially inwardly to form a rounded shoulder 11 in the transition to the neck 7 which is of substantially less external diameter than the stock 6. The wall thickness of the neck 7 is at a minimum at weak point 12 adjacent to the rounded shoulder 11 and increases slightly towards the head 8. The head is externally cylindrical with a ledge 13 at its lower edge forming the transition from the neck 7 to the head 8. The external diameter of the head is greater than that of the neck 7 but smaller than that of the stock 6 below the shoulder 11. The free end of the head is formed as an annular punch having a cutting edge 14. The internal diameter of the rivet is constant so that there is a cylindrical passage 15 through the rivet.

At the free end of the upper limb there is a ring-shaped portion 16 defining a receiver hole 17a which comes into alignment with the rivet 5 when the tag is being closed and which is of marginally greater diameter than the external diameter of the head 8 but which is of smaller diameter than the external diameter of the stock 6 below the shoulder 11. The ring-shaped portion 16 includes a central annulus 18a which slopes upwardly towards the receiver hole 17a. The sloping central annulus 18a is hardened so that it is harder than the neck 7 of the rivet. When the strip is of brass, the hardening may suitably be effected by mechanical working of the brass. More particularly, the receiver hole and sloping central annulus may suitably be formed by stamping, preferably with a conical stamping tool so that the metal of the strip is redistributed around the receiver hole and any cutting which may be required to form the receiver hole accurately is carried out only after initial stamping and redistribution of the brass.

The ring-shaped portion 16 is integral with limb 3 but is joined to the remainder of the limb only by a bridge which is of reduced width as compared to the remainder of the limb as shown in FIG. 3 and which may optionally have grooves on both top and bottom surfaces to form a zone of weakness across the limb.

Both the bottom limb 2 and the top limb 3 have raised longitudinal edges 26 which stand proud of the outer surface of the limb. These raised edges run along both limbs but not around the curved part 27 of the strip. Official markings are impressed into the outer surface of one or both of the limbs and the raised edges serve to protect the markings from abrasion. If an official marking is to be impressed into the surface of one limb only, the raised edges 26 may of course be omitted on the other limb.

FIG. 16 shows the tag in the closed position. The head 8 of the rivet has passed through the receiver hole 17a and has subsequently been deformed outwardly to a splayed configuration. The central annulus 18a on the ring-shaped portion 16 of the upper limb 3 is seated on the shoulder 11.

Figure 17:
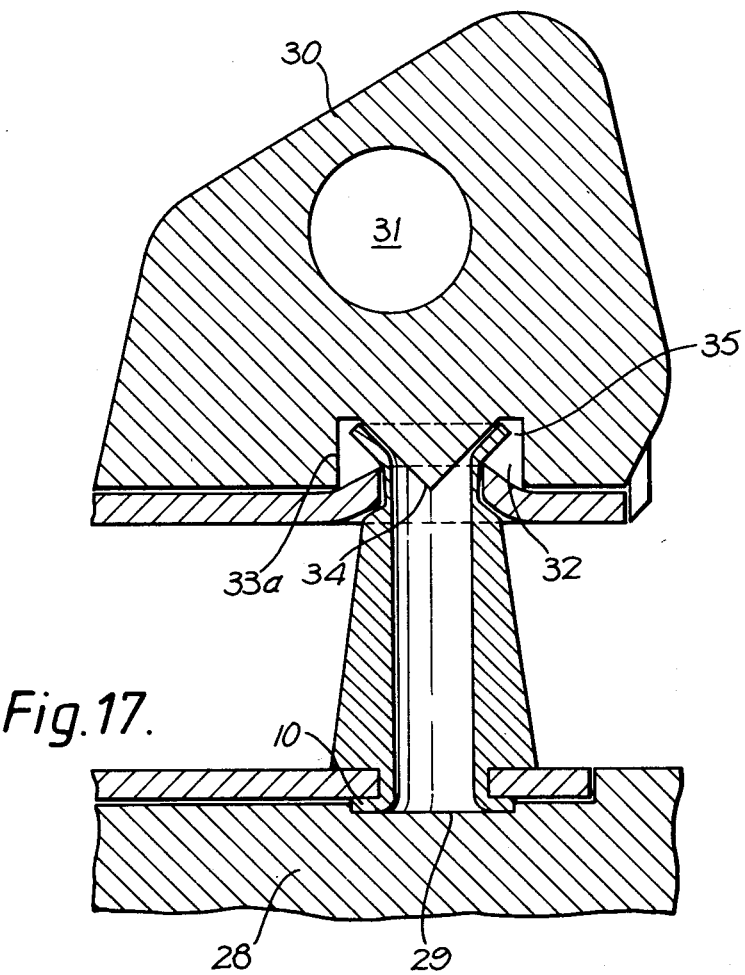
FIG. 17 is a vertical sectional view of an embodiment similar to that of FIG. 15 in the closed position in a tagging tool (shown in part)
Figure 18:
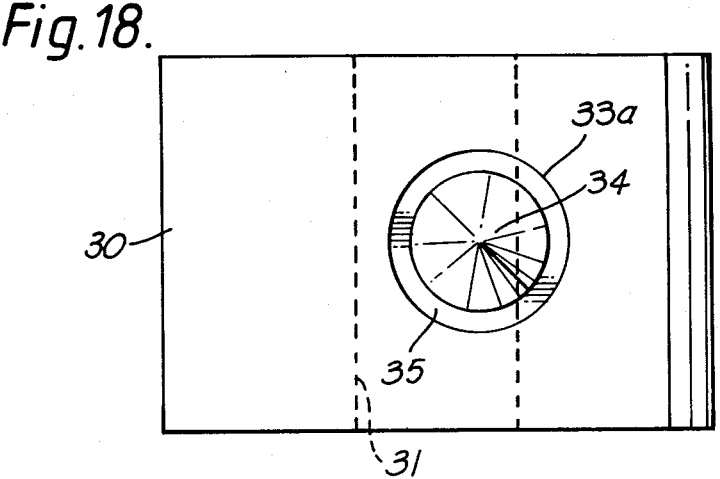
FIG. 18 is a plan view of a deforming insert for a tagging tool as shown in FIG. 17.

The tag is applied by a tagging tool such as a quick release pliers of the type available from Richard Herberholz KG, Wuppertal, Federal Republic of Germany. As shown in FIG. 17, one arm 28 of the pliers is provided with a recess 29 which receives the flange 10 at the lower end of the rivet. Pivotally mounted in the other (fixed) arm of the pliers is an insert 30 which can pivot through a small arc on a screw passing through a pivot hole 31. The insert 30 has a cylindrical recess 32 surrounded by a wall 33a.

Axially disposed in the recess is a conical boss 34 whose apex lies substantially in the same plane as the leading edge of wall 33a. The conical boss 34 has a base diameter less than the diameter of the recess so that a trough 35 is formed around the boss (see FIG. 18).

When the tag is being applied, an animal's ear is inserted between the top of head 8 and the underside of the top limb 3. As the tagging tool is closed the cutting edge 14 on top of the head 8, interacting with the receiver hole 17a on the upper limb 3, cuts through the ear and cuts out a circle of flesh which is usually discharged through passage 15 along the axis of the rivet. If the fragment of flesh is not discharged, it may be dislodged from the passage by a match-stick or narrow rod or the like at any time when the tag is being inspected. Because the head 8 has an external diameter which is only marginally smaller than the diameter of the receiver hole 17a, the head acts like a paper punch, and tissue and hair are removed, thus avoiding clogging of the tag.

The head 8 passes through receiver hole 17a and, as the tool continues to close, head 8 encounters conical boss 34 and the head is splayed outwardly without splitting. FIG. 3 shows the situation when the tool has reached its fully closed position, just before the quick release mechanism operates to open the tool. It will be seen that the head has been splayed out to an external diameter which is slightly less than the diameter of the recess 32 so that the head can leave the recess when the tool is opened.

If an attempt is made to tamper with the tag by forcing limbs 2 and 3 apart the domed hardened annulus 18a resists any movement which would cause it to deform downwardly. Due to the relative weakness of the neck 7, and the interaction of the hard annulus 18a against soft brass, the most likely result is that the head will break off from the stock. As the wall thickness of the neck is smallest at point 12 adjacent to shoulder 11, the fracture will usually occur at this point, leaving no appreciable fragment of the neck which could be used in an attempt to re-use the tag.

A suitable tag has a strip 1 made from brass with a hardness of 100–115 Brinell particularly 105–110 Brinell Brass, being relatively soft, allows deep embossing of code letters and numbers, which are easy to read, without causing undue wear to the embossing tool and shortening its useful life. The strip 1 is of uniform thickness and it is not necessary to start with a strip of greater thickness and mill it down to form limb portions of lesser thickness and end portions of greater thickness, as are required for the tag of FIG. 1. Preferably the zone around the receiver hole is hardened to about 120 Brinell.

The rivet is suitably turned brass having a hardness such that it cuts the ear of an animal, that it deforms on meeting the conical boss 34 to form a splayed head without splitting and that it breaks at the neck when an attempt is made to force the tag open. The neck portion may be annealed to weaken it further, if desired. A suitable brass is leaded brass (e.g. MS 63 Pb) of rivetting quality.

In the preferred method of manufacturing the tag of the fifth embodiment described above, the strip 1 is stamped out as a flat strip with the mounting hole 4 cut therein and the receiver hole 17a with the sloped annular portion 18a around it formed by the stamping operation as described above.

The bottom of the rivet is inserted through the mounting hole 4 and its lower extremity is outwardly swaged into position. The official marking is then impressed onto flange 10. Finally the strip 1 is bent to form the two limbs 2 and 3 joined by the curved portion 27.

In one sample of the fifth embodiment, the strip 1 is 1 mm thick. The receiver hole 17 is 4.2 mm in diameter. The head 8 is 4 mm in external diameter and 2.0 mm high. The neck, which is 1.8 mm high, varies in external diameter from 3.6 mm at point 12 to 3.7 mm adjacent to ledge 13. The internal diameter of the rivet is 3 mm. The external diameter of the stock increases from 5 mm at shoulder 11 to 8 mm at the lower limb 2. The height of the rivet from lower limb 2 to the top of the head is 13.5 mm. The height of the rivet may be varied to suit the average thickness of the ears or other parts of the animals to be tagged.

Figure 19:
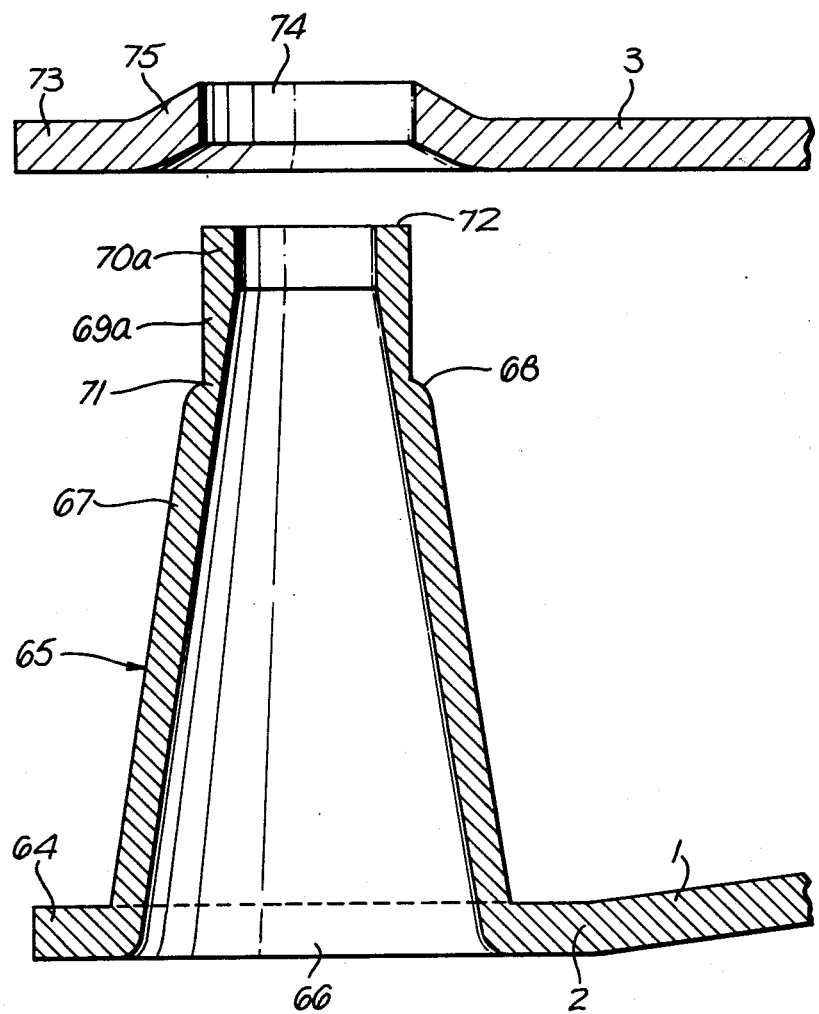
FIG. 19 is a vertical sectional view of part of a sixth embodiment of the invention, showing a portion of the tag in the open position.
Figure 20:
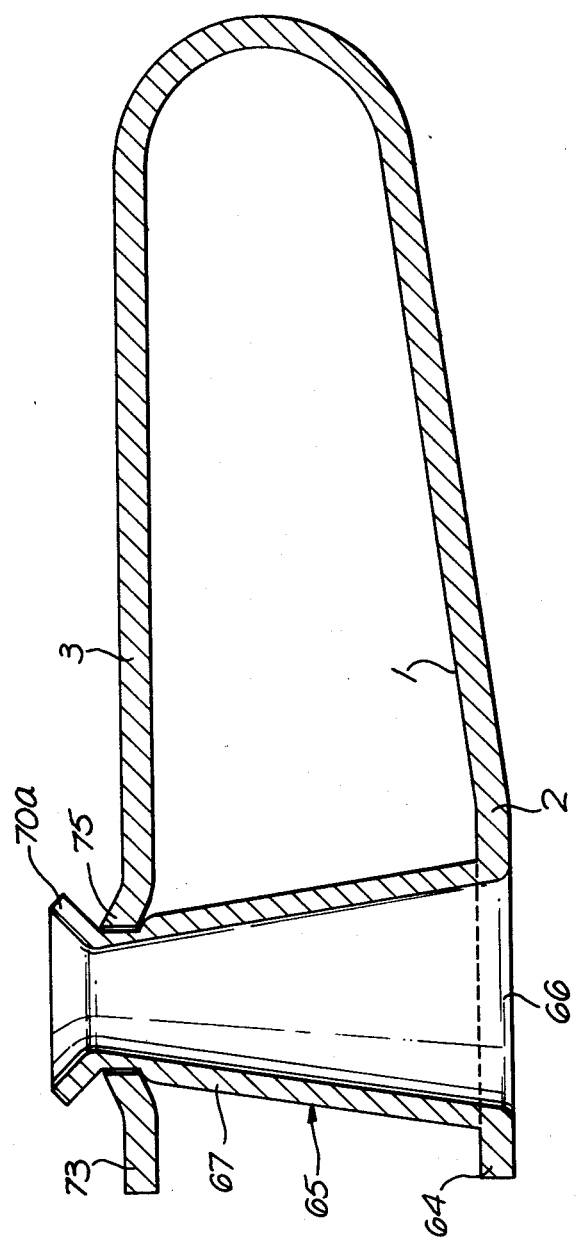
FIG. 20 is a vertical sectional view of the sixth embodiment of the invention, showing the tag in the closed position.

In the sixth embodiment of the invention, as shown in FIGS. 19–20, a hollow rivet 65 has been formed from the metal of the free end portion 64 of the lower limb by stamping and deforming the metal, for example with a series of forming tools co-operating with a corresponding series of female moulds, each tool deforming the metal progressively until it reaches the shape of the rivet shown in FIG. 19. After each deformation, the metal is allowed time to recover before the next stamping operation is carried out. The last male tool has the configuration of the hollow interior of the rivet while the final female mould has the configuration of the exterior of the rivet. It will be noted that the interior of the rivet tapers upwardly so that the final male tool can be withdrawn easily. The area of the lower limb from which the rivet 65 has been formed is left as a mounting hole 66.

The rivet 65 has a stock portion 67 of frusto-conical exterior and a substantially constant wall thickness. At its top end, the stock portion curves radially inwardly to form a rounded shoulder 68 in the transition to a head 70a which is of smaller external diameter than the stock portion 67. The head is externally cylindrical but the upwardly tapering interior surface is continued from the stock portion part of the way up the head so that a neck 69a of reduced wall thickness is formed and the wall thickness is at a minimum at point 71 adjacent to shoulder 68. The free end of the head is formed as an annular punch having a cutting edge 72. If desired, the free end of the head can be internally chamfered. When the tag is of brass, the rivet may be annealed to soften the brass, particularly in the neck and adjacent to the weak point 71.

At the free end of the upper limb 3 there is a ring-shaped portion 73 (i.e. ring-shaped in the plane perpendicular to the drawing) defining a receiver hole 74 which comes into alignment with the rivet 65 when the tag is being closed and which is of marginally greater diameter than the external diameter of the head 70a. The ring-shaped portion 73 includes a central annulus 75 which slopes upwardly towards the receiver hole 74.

The receiver hole and sloping central annulus may suitably be formed by stamping, preferably with a conical stamping tool so that the metal of the strip is redistributed around the receiver hole and is not cut away. When the strip is of brass, the stamping operation hardens the brass by working it mechanically so that an area of increased hardness is formed around the receiver hole.

The ring-shaped portion 73 is integral with limb 3 but is joined to the remainder of the limb only by a bridge which is of reduced width (in the plane perpendicular to the drawings) as compared to the remainder of the limb and which may optionally have grooves on both top and bottom surfaces to form a zone of weakness across the limb.

Both the bottom limb 2 and the top limb 3 may have raised longitudinal edges which stand proud of the outer surface of the limb. These raised edges run along both limbs but not around the curved part (not shown) of the strip which forms the two limbs. Markings are impressed into the outer surface of one or both of the limbs and the raised edges serve to protect the markings from abrasion. If marking is to be impressed into the surface of one limb only, the raised edges may of course be omitted on the other limb.

FIG. 20 shows the tag in the closed position. The head 70a of the rivet has passed through the receiver hole 74 and has subsequently been deformed outwardly to a splayed configuration. The central annulus 75 of the ring-shaped portion 73 of the upper limb 3 is seated on the shoulder 68 and is trapped below the splayed out portion of the head 70a.

The tag is applied by a tagging tool in the same manner as described with reference to FIGS. 15–18.

The tags of FIGS. 1–18 may be modified to incorporate the head and neck of the tag of FIGS. 19 and 20, or the line of the exterior surface of the neck in the tag of FIGS. 1–18 may be continued upwardly into the head, so that the ledge 13 is omitted.

Figure 21:
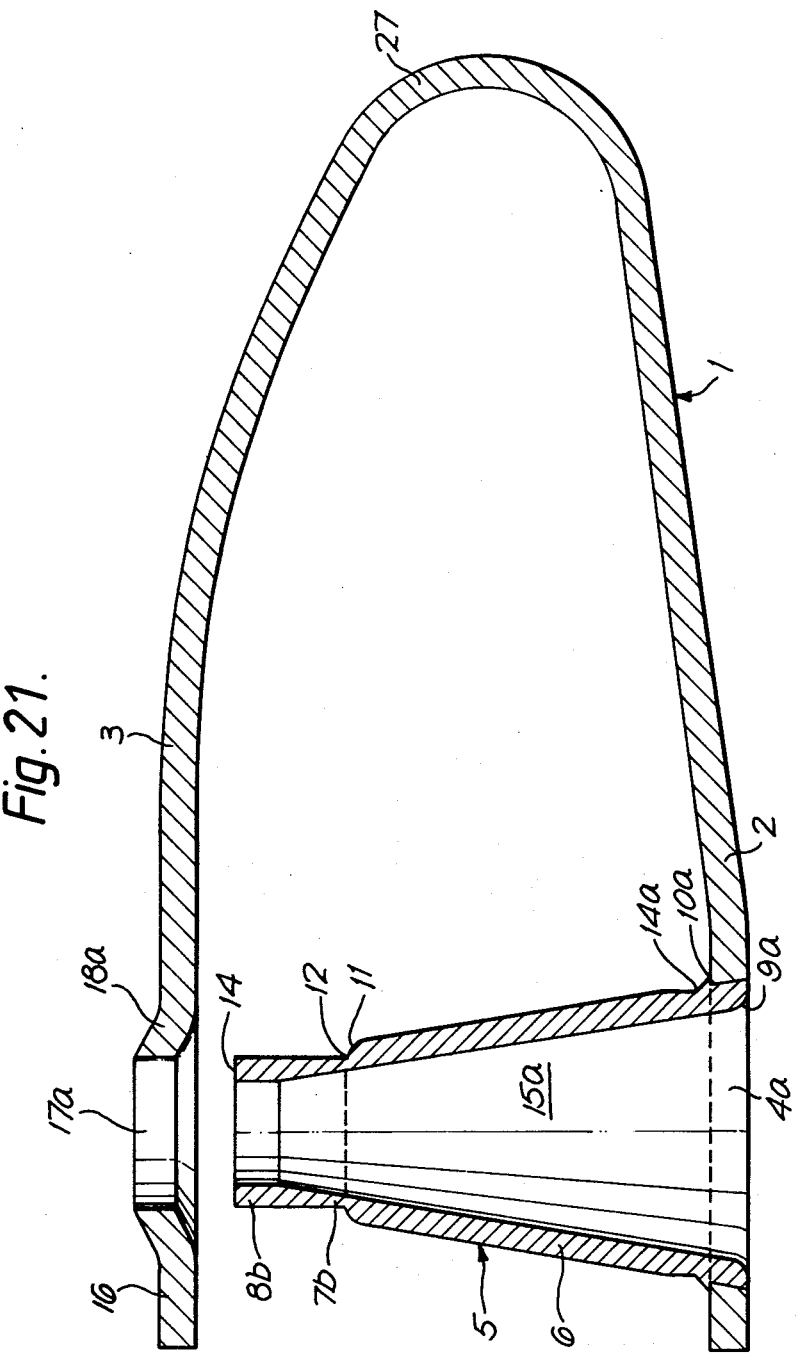
FIG. 21 is a vertical sectional view showing a seventh embodiment in the open position.
Figure 22:
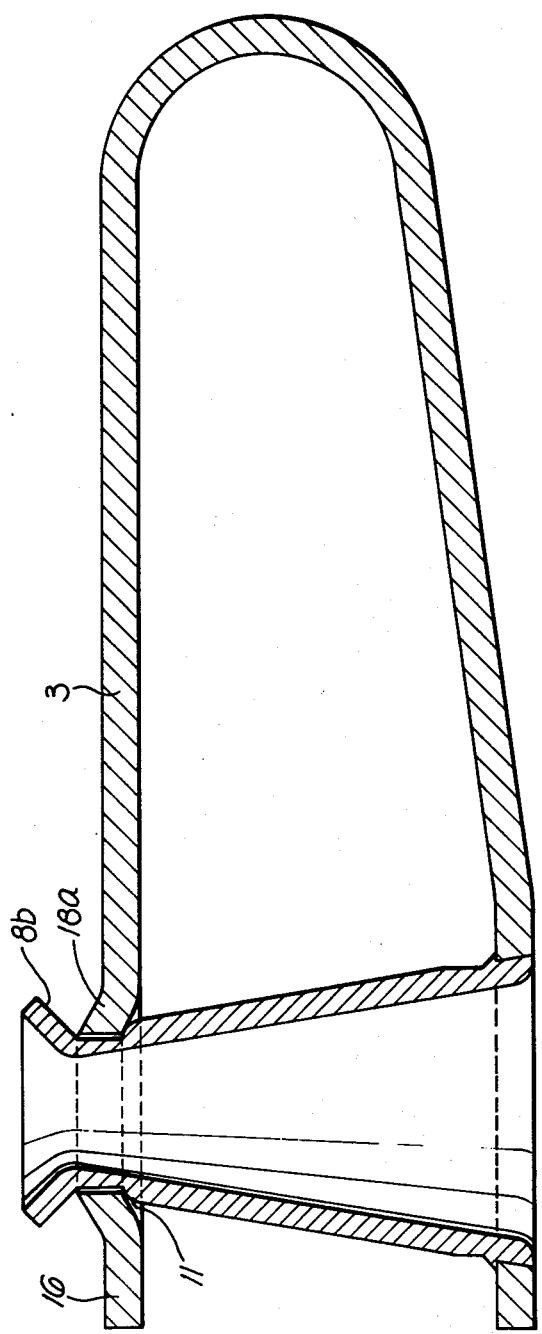
FIG. 22 is similar to FIG. 21 but showing the seventh embodiment in the closed portion.

As shown in FIGS. 21–23, an ear tag in accordance with the invention comprises a strip 1 doubled over to form a lower limb 2 and an upper limb 3. Near to the free end of lower limb 2 there is a mounting hole 4a in which is secured a hollow rivet or piercing member 5 comprising a stock and a neck or weak portion 7 and a head 8. The rivet 5 stands up from the lower limb 2 at right angles thereto.

The main part of the stock portion has a frusto-conical external surface which tapers upwardly. The stock portion is of substantially constant wall thickness so that the interior passage 15a tapers upwardly. The rivet has been formed with a smooth frusto-conical exterior surface, most suitably by deforming a cylindrical blank using one or more conical for frusto-conical mandrels. Conveniently the cylindrical blank may have an initial diameter approximately equal to the median diameter of the finished rivet, so that the base of the rivet has been formed by expanding the blank while the head of the rivet has been formed by reducing the diameter of the blank.

The mounting hole 4a has an upwardly-converging wall having the same configuration and diameter as the bottom extremity 9a of the rivet. The rivet has been inserted into the mounting hole from below until the conical surface of the bottom extremity 9a of the rivet mates against the wall of the mounting hole, so that no further upward movement of the rivet is possible. A deforming tool is then brought down on the rivet from above to disperse part of the external surface of the rivet to form recess 14a and a retaining lip 10a which engages the upper surface of the strip around the mounting hole 4. This lip prevents the rivet being removed downwardly from the strip. During this deforming step, the rivet is supported internally by a conical or frusto-conical mandrel inserted from the bottom of the rivet. This mandrel also acts against the lower end of the rivet and exerts radially outward pressure on it as the conical mandrel is pushed in the opposite direction to the external deforming tool. This outward pressure ensures secure and even mating of the rivet against the wall of the mounting hole 4a, and it rounds off the bottom extremity 9a of the rivet.

In an alternative procedure, the bottom extremity of the rivet may be swaged outwardly to form a flange below the bottom surface of the strip, which may optionally be rebated to receive the flange.

At the top of the stock the external surface curves radially inwardly to form a rounded shoulder 11 in the transition to a head 8b which is of smaller external diameter than the stock 6. The head is externally cylindrical but the upwardly tapering interior surface is continued from the stock portion part of the way up the head so that a neck 7b of reduced wall thickness is formed and the wall thickness is at a minimum at point 12 adjacent to shoulder 11. The free end of the head is formed as an annular punch having a cutting edge 14. If desired the free end of the head can be internally chamfered.

The remainder of the tag and its manner of use are the same as those of FIGS. 15-18.

When one of the tags according to FIGS. 15-23 is made from brass having a hardness in the range 100-120 Brinell (or ½-¾ hard) and the zone around the receiver hole is further hardened as a result of stamping, the tag has "tamper-proof" qualities comparable to those of FIGS. 1-14. If an attempt is made to open the tag by forcing the limbs apart, interaction between the hardened brass around the receiver hole and the weak neck of the rivet is most likely to lead to the head breaking off from the stock portion. Due to the domed shape of the annulus around the receiver hole, an attempt to draw the rivet downwards through the receiver hole tends to reduce the diameter of the receiver hole so that it grips the rivet. The fracture of the rivet will usually occur at the weak point adjacent to the shoulder, leaving no appreciable fragment of the neck which could be used in an attempt stop re-use the tag.

The frusto-conical shape of the stock portion defeats any attempt to tamper with the tag by sawing through the stock and then fitting a cylindrical sleeve around the stock to conceal the saw cut. The provision of a rivet by deformation of the material of the strip (as in FIGS. 19 and 20) avoids an assembly step which is necessary in making tags with a separate rivet which has to be secured in the strip. The integral rivet cannot be tampered with at its lower end and there is no danger of a rivet being substituted in an attempt to re-use the tag.

The frusto-conical shape of the stock portion is of particular advantage in the tag of FIGS. 19 and 20, wherein the rivet is formed from the material of the strip. The base of the frusto-conical shape is of much greater area than the base of a cylinder having the diameter of the shoulder region of the stock portion. Therefore the area of the strip from which the rivet is formed is substantially greater than would be the case if the stock portion were cylindrical. This means that substantially more metal is available for formation of the rivet than would be available if an attempt were made to form a cylindrical rivet by stamping, and a rivet of acceptable strength can be formed from the material of the strip without providing an increased thickness of metal in the end portion of the lower limb. Therefore an acceptable tamper-proof ear tag can be formed from brass strip having a thickness of 1 mm.

As compared to the tags of FIGS. 15-20, the tag of FIG. 21 can be produced more cheaply because there is little waste in the formation of the rivet and yet a rivet of satisfactory strength can be produced. The rivet can be made from a cylindrical blank having a wall thickness of 1 mm.

A tag constructed as above described may have other uses as a tamper proof means of marking or securing articles to which it may be applied and the invention is not limited to the specific use of the tag for attachment to animal's ears.

We claim:

1. A tamperproof tag comprising a strip formed into two limbs and a hollow metal rivet standing up at the free end of one of the limbs, said rivet comprising a stock portion surmounted by a narrower neck portion surmounted by a head portion which is externally cylindrical, said rivet having a shoulder between the stock portion and the neck portion, a receiver hole through the strip near to the free end of the second of said limbs, the receiver hole being of marginally greater diameter than the external diameter of the head portion of the rivet but of smaller diameter than the shoulder so that the receiver hole receives the head portion of the rivet when the tag is closed, and the head portion deforms radially outwardly to a splayed configuration, wherein the wall thickness of the rivet in the neck portion is less than that in the stock portion or head portion and is at a minimum adjacent the shoulder so that if an attempt is made to force the limbs of the tag apart after it has been closed, fracture of the rivet will occur adjacent the shoulder.

2. A tag according to claim 1 wherein a spring clip is secured over the receiver hole and coaxial therewith, the clip being adapted to allow the head portion of the rivet to be forcibly passed through it and being then adapted to interact with the rivet to cause it to break at the neck portion if an attempt is made to force the limbs apart.

3. A tag according to claim 1 wherein the strip is of metal and the metal which defines the receiver hole is hardened so that it is adapted to interact with the splayed rivet to cause it to break at the neck portion if an attempt is made to force the limbs of the tag apart after it has been closed.

4. A tag according to claim 3 wherein the hardening of the metal around the receiver hole has been effected by working the metal.

5. A tag according to claim 1 wherein the head portion is sharpened at its free edge and is a close fit within the receiver hole so that it acts as a punch.

6. A tag according to claim 1 or 3, wherein the strip and rivet are of brass.

7. A tag according to claim 1 wherein the stock portion has a shank having a frusto-conical external surface tapering upwardly towards the neck.

8. A tag according to claim 7 wherein the rivet is formed as a separate component from the strip but has a stock portion of frusto-conical exterior and substantially constant wall thickness, the rivet being secured in a mounting hole in the strip which is of substantially the same diameter as the external surface of the base of the stock portion of the rivet.

9. A tag according to claim 1, wherein the shoulder provides a mating surface for a portion of the second limb defining the receiver hole.

10. A tag according to claim 1 wherein the rivet is integral with and formed from the material of the strip.

* * * * *